UNITED STATES PATENT OFFICE.

ALBERT C. LEWIS, OF BROOKLYN, NEW YORK.

IMPROVEMENT IN THE MANUFACTURE OF IRON.

Specification forming part of Letters Patent No. 168,263, dated September 28, 1875; application filed May 27, 1875.

*To all whom it may concern:*

Be it known that I, ALBERT C. LEWIS, of Brooklyn, Kings county, State of New York, have invented an Improvement in the Manufacture of Iron, of which the following is a specification:

The object of this invention is to remove the impurities of cast-iron and adapt the same to the manufacture of wrought or cast iron or steel.

Nearly all pig-iron contains considerable silicon, with sometimes manganese, and more or less of phosphorus and sulphur in addition to the carbon.

The object of this invention is to remove the silicon and the principal portion of the sulphur and phosphorus, so as to obtain iron that is as nearly pure as possible. Of course the carbon will be either removed or allowed to remain according to the quality desired in the product, so as to form a higher or lower grade of steel.

For iron which contains about .0220 of sulphur; .0203 of phosphorus; .1652 of silicon, and .089 of manganese, I employ the following materials: Silica, by weight, about fourteen parts; manganese, by weight, about twenty-eight parts; wolfram, by weight, about fifty-eight parts. These are to be mixed together in a ground condition.

The silica which I make use of is found in Nevada, and is nearly pure, and it is known in the market as silica or electro-silicon.

For the manufacture of wrought-iron I take of said mixture from one and a half to three and and half per cent., and throw the same into the furnace during the heating and puddling operation. It is preferable to divide up such material into about four charges, and introduce the same at intervals of about ten minutes apart during the puddling operation.

Wrought-iron prepared in this manner possesses great purity, and more or less carbon may be allowed to remain, so that the same is a low quality of steel, and, by analysis, iron of this character is found to be free from silicon and manganese, and with such small traces of sulphur and phosphorus as to be scarcely capable of detection.

In the process the silica and manganese, added with the wolfram to the iron, appear to combine with the foreign matters in the iron, and pass away in the slag or the gases evolved; and I remark that other ingredients having the same properties as the manganese and wolfram may be substituted for those substances, and the proportions may vary according to the impurities in the iron.

With cast iron and steel and Bessemer steel the ingredients named may be employed for removing the silicon, manganese, phosphorus, and other matters, and the product will be improved thereby, and according to the manner of conducting the refining operation, so the product will contain more or less carbon, and be either a wrought or cast iron or steel of a higher or lower quality.

This improved method of purifying iron may be used in a puddling-furnace, an open-hearth furnace, or in a ladle after melting in a cupola, or in a crucible, in the the manufacture of cast-steel from the Bessemer scrap or iron of inferior quality.

I claim as my invention—

The method herein specified of removing foreign substances from iron by a mixture composed of the above-described silica, wolfram, and manganese introduced into the melted metal, substantially as and for the purposes set forth.

Signed by me this 26th day of May, 1875.

ALBERT C. LEWIS.

Witnesses:
    GEO. T. PINCKNEY,
    CHAS. H. SMITH.